March 22, 1949.   C. R. SCHAFER   2,465,277
ELECTRON BEAM TELEMETERING SYSTEM
Filed Oct. 17, 1945

INVENTOR.
CURTISS R. SCHAFER
BY
George N. Fisher
ATTORNEY

Patented Mar. 22, 1949

2,465,277

UNITED STATES PATENT OFFICE 2,465,277

ELECTRON BEAM TELEMETERING SYSTEM

Curtiss R. Schafer, Rye, N. Y., assignor to Minneapolis-Honeywell Regulator Company, Minneapolis, Minn., a corporation of Delaware Application October 17, 1945, Serial No. 622,729

14 Claims. (Cl. 177—351)

1

This invention relates to the field of control devices and more particularly to devices responsive to magnetic fields such for example as magnetic compasses.

Instruments in which use is made of the deflecting effect of the magnetic field of the earth on the beam of a cathode ray tube to perform the functions of a compass are known in the art, but in previous applications of this principle the output from the cathode ray tube has been a part of a high impedance circuit which for certain applications is undesirable.

It is an object of the present invention to provide improved electronic means for deriving from a high impedance circuit a proportional signal in a low impedance circuit.

It is another object of my invention to provide a cathode ray tube in which the beam impinges in heat generating relationship on arms of a low impedance resistance bridge.

Another object of this invention is to provide a condition responsive system in which the beam of a cathode ray tube is deflected from a normal position to differentially heat arms of a low impedance bridge which controls operation of a motor driven indicator.

A further object of the invention is to provide a condition responsive system in which the beam of a cathode ray tube is deflected from a normal position to differentially heat arms of a low impedance bridge which controls operation of a motor actuating an indicator and a bridge rebalancing system.

Yet another object of my invention is to provide a condition responsive system in which the beam of a cathode ray tube is deflected from a normal position to differentially heat arms of a low impedance bridge which controls operation of a motor actuating an indicator and means for counteracting the deflection of the beam.

A still further object of my invention is to provide a condition responsive system of the class described in which the counteraction of the deflection of the beam takes place about two perpendicular axes under the influence of two bridges each having arms arranged for impingement by said beam.

It is a specific object of this invention to provide a target for a cathode ray comprising a plurality of coplanar filar grids arranged in bilateral symmetry about a common axis, the grids of each pair being connected in series for comprising adjacent arms of a bridge circuit.

Various other objects, advantages and features of novelty which characterize my invention are pointed out with particularity in the claims annexed hereto and forming a part, hereof. However, for a better understanding of the invention, its advantages, and objects attained by its use, reference should be had to the subjoined drawing, which forms a further part hereof, and to the accompanying descriptive matter, in which I have illustrated and described a perferred embodiment of my invention. In the drawing:

Figure 1:
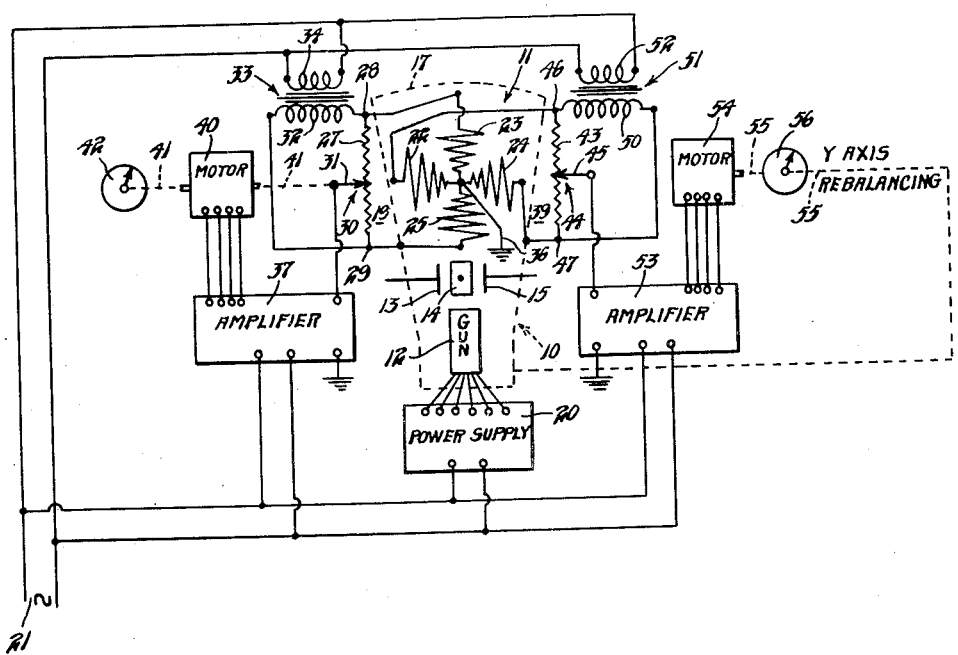
Figure 1 is a schematic showing of a system embodying my invention.
Figure 2:
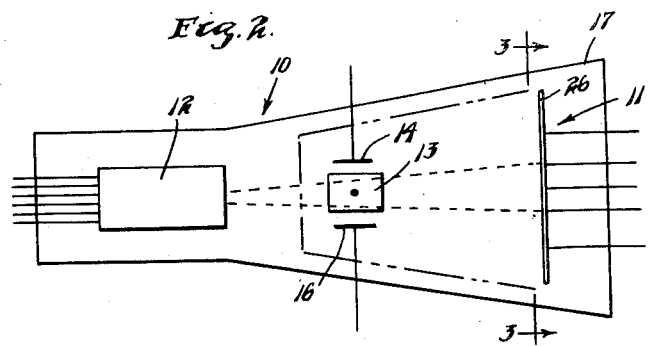
Figure 2 is a diagrammatic showing of a cathode ray tube particularly adapted for use in the system of Figure 1.

In the preferred embodiment of my invention, a beam of electrons of substantial cross sectional area is projected along an axis in a cathode ray tube from the conventional electron gun, and is arranged to impinge equally on a number of target grids made of fine resistance wire having a relatively high temperature coefficient of resistance and a relatively low thermal mass, the grids being arranged to comprise arms of a pair of resistance bridges. According to well known principles, impingement of the beam on the metallic grid is effective to raise the temperature of the grid, and this in turn increases the total resistance of the grid in proportion to the temperature rise and to the amount of wire so heated. Each of the grids has an angular outline, and the grids are arranged in diametrically opposite pairs, the two pairs cooperating to cover the area of the target. It will be realized of course that if it is desired to further subdivide the circular arrangement the sectors can be made with included angles of 60, 45, or 30 degrees, the number of pairs being porportionally increased. It will also be realized that thin laminar sections of the material may be used instead of grids at the choice of the designer, and that for other applications a pair of target members, or even a single member may suffice instead of the four here found expedient.

Each diametrically opposite pair of grids comprises two adjacent arms of a low frequency resistance bridge which is continuously energized from a suitable source of low frequency alternating voltage. Each bridge is designed for balance in the absence of any electron beam, and will remain in balance when the beam impinges upon the grids so long as the grids are equally impinged, that is, so long as the heating effect of the beam on the two grids is equal. The bridge is unbalanced, however, by deflection of the beam so that it impinges more upon one grid and less upon the other grid of the pair, an unbalance signal is then supplied by the bridge and is fed through a phase responsive amplifier of conventional design to cause energization of an alternating current motor.

In the preferred embodiment of my invention, two pairs of grids are used each subtending 90 degrees, and the grids are so arranged in the cathode ray tube, relative to the conventional deflecting plates of the tube, that movement of the beam in response to a deflecting voltage on each set of plates simply is effective to move the beam along the center line of one of the pairs of grids so as not to change the heating of the other pair of grids.

The motor referred to is mechanically connected with an indicator, and the mechanical connection is such that the angle indicated by the indicator is equal to the angular displacement of the beam of the cathode ray tube. In some cases it may be desired to rebalance the bridge concurrently with operation of the indicator while in other cases it may be more desirable to restore the normal condition of the cathode ray beam with respect to the targets concurrently with the operation of the indicator. The latter can be accomplished either by mounting the cathode ray tube on suitable axes for rotation as a unit to move the targets with respect to the beam, or by varying potentials on the deflecting plates to counteract the effect of the magnetic field on the beam and therefore to bring the beam back to its original position. Both of these expedients are known in the art and are not specifically disclosed in the present application.

Referring now to Figure 1, it will be seen that this embodiment of my invention comprises a cathode ray tube 10 including a target 11, an electron gun 12, and a plurality of deflecting plates 13, 14, 15, and 16 all contained within a suitable envelope 17. Electron gun 12 is energized from a conventional power supply 20 which in turn derives its energy from a source 21 of alternating voltage.

Figure 3:
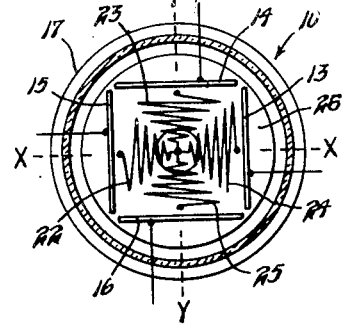
Figure 3 is a cross sectional view of the cathode ray tube of Figure 2 taken along the line 3—3 and looking in the direction of the arrows.

Target 11 is seen to comprise a plurality of resistors 22, 23, 24, and 25. Each of these resistors is made of a single wire of material having a high temperature coefficient of resistance formed into a grid having the outline of a right triangle, although if desired the portion of the resistor corresponding to the hypotenuse of the triangle may be somewhat extended so that the outline of the resistor resembles a circular sector. A relatively fine wire is used, the thermal mass of the wire being so small that an increase in applied heat results in an immediate rise in the temperature of the wire. The resistors are mounted in coplanar relation in symmetrical pairs about the center of the target on a mica disk 26 or some other suitable support of heat resistant material, and the whole target is supported in the cathode ray tube so that the impingement of the beam in its normal position includes equal areas of the four grids as suggested by the small circle in Figure 3.

The two grids of each pair are connected at their centers to comprise a single series circuit. In the embodiment of the invention shown in Figure 1, the two pairs are joined at the center as well, so that a single lead may serve to connect both pairs of grids with circuits external of the tube. It will, of course, be apparent that if it is desired to operate the pairs of grids electrically independently this can be done by bringing out separate leads from the centers of the respective pairs.

Resistors 23 and 25 form a resistance bridge 19 with the upper and lower portions of the winding 27 of a voltage divider 30, the relative resistances of the two portions being determined by the position of slider 31 of the voltage divider. The terminals 28 and 29 of the voltage divider comprise the input terminals of the bridge, which is energized from the secondary winding 32 of a transformer 33 whose primary winding 34 is energized from source 21. Slider 31 and the common ground connection 36 comprise the output terminals of bridge 19, and are connected to the input terminals of an amplifier 37. Amplifier 37 obtains its energization from source 21 and energizes a motor 40 for forward and reverse operation upon opposite unbalance of the bridge. The shaft 41 of motor 40 actuates an indicator 42 and also is effective to move the slider 31 of voltage divider 30 until the bridge is balanced, when the signal to the amplifier is interrupted and operation of the motor ceases. A motor control amplifier adapted to this use is shown in Whitman Patent 1,942,587. It will be appreciated that this system brings about balance of the bridge circuit when the beam is displaced from its normal axis.

Resistors 22 and 24 form a resistance bridge 39 with the upper and lower portions of the winding 43 of a voltage divider 44, the relative resistances of the two portions being determined by the position of slider 45 of the voltage divider. The terminals 46 and 47 of the voltage divider comprise the input terminals of the bridge, which is energized from the secondary winding 50 of a transformer 51 whose primary winding 52 is energized from source 21. Slider 45 and the common ground connection 36 comprise the output terminals of bridge 39, and are connected to the input terminals of an amplifier 53. Amplifier 53 obtains its energization from source 21 and energizes a motor 54 for forward and reverse operation upon opposite unbalance of the bridge. The shaft 55 of motor 54 actuates indicator 56, and is also connected to tube 10 to rotate it about the Y—Y axis, identified in Figure 3, by any suitable pivotal mounting, not shown. Operation of motor 54 is accordingly effective to bring about a resumption of the normal relationship between the beam and the target, by rotation of the tube in its pivotal mounting. It will be appreciated that the beam may be returned to its normal axis by the application of suitable potentials to the deflecting plates instead of by rotating the tube, and shaft 55 may be connected to a voltage divider for distributing suitable voltages to the plates, instead of to the tube rotating mechanism, if desired. Since the details of either of these expedients form no portion of the present invention, they are not specifically disclosed herein.

Operation

The operation of my invention should be evident from the foregoing discussion although it may differ in detail depending on whether the rebalancing by control of the impingement of the beam on the target is brought about by mechanical or electrical means. Let it be assumed that the cathode ray tube is mounted with the normal axis of the beam horizontal and along the magnetic meridian, and with the deflecting plates 13 and 15 vertical. Upon energization of the electron gun, the cathode ray beam is directed toward the target, and due to the vertical component of the earth's magnetic field the beam is deflected to the east if the tube is pointed north. This results in an increase in the area of grid 22 impinged by the beam, together with a corresponding decrease in the area of grid 24 impinged by the beam, thus bringing about an unbalance of bridge 39. The area of grids 23 and 25 impinged by the beam decreases, but since this is at the same rate no effect is had on bridge 19.

Unbalance of bridge 39 results in the transmission of a signal to amplifier 53 which results in operation of motor 54 in a first or forward direction such as to cause clockwise movement of indicator 56 to indicate an angle, with respect to its zero position, which is to be interpreted as the dip angle at the location of the compass, and also results, through shaft 55 and the associated devices, in bringing about the return of the beam to its central position. When this is accomplished the instrument remains in what may be considered as its normal operative position (so long as the vertical component of the earth's field does not change), either with the axis of the tube tilted downwardly or with a positive potential on deflecting plate 13 as compared with that on deflecting plate 15.

Now if the cathode ray tube be turned in azimuth, toward the west, the effect of the horizontal component of the earth's magnetic field is to move the beam upward. As the beam moves upward, resistor 23 is impinged to a greater extent and resistor 25 is impinged to a lesser extent than in the normal orientation of the beam, the resistance of resistor 23 increases and that of resistor 25 decreases and bridge 19 is unbalanced in a first direction. This results in a signal of a first phase being transmitted to amplifier 37, which causes operation of motor 40 in a first or forward direction, such as to cause movement of indicator 42 from the due north position to indicate an angle west of north, and simultaneous movement of slider 31 downwardly along resistance winding 27 until the bridge is again balanced. When this occurs, no further signal is impressed on amplifier 37 and operation of motor 40 ceases.

If the cathode ray tube is turned toward the east instead of to the west, the beam is deflected downward, thus increasing the resistance of resistor 25 and decreasing that of resistor 23. Bridge 19 is again unbalanced to give a signal to amplifier 37, but this signal is of the opposite phase to that resulting from the former unbalance of the bridge, and motor 40 is energized in a reverse direction, causing movement of indicator 42 in an easterly direction from its former position and moving slider 31 upwardly along winding 27 to rebalance the bridge.

I have described my invention as embodied in a device responsive to the earth's magnetic field, that is, in a magnetic compass. It is specifically pointed out, however, that the device is not limited to such an application but may be used wherever an instrument is desired for response to a magnetic field, and moreover may be used wherever it is desired to derive a low impedance response from the deflection of a cathode ray beam. The output of bridges 19 and 39 is proportional to the deflection of the beam about the two axes regardless of whether this is accomplished in response to the earth's magnetic field or in conventional cathode ray measurement practice, and results in a particularly satisfactory method of motor operation in response to the deflection of the cathode ray beam. Many other applications of the principle to measuring and control instruments will at once suggest themselves to those skilled in the art.

Numerous objects and advantages of my invention have been set forth in the foregoing description together with details of the structure and function of the invention, and the novel features thereof are pointed out in the appended claims. The disclosure, however, is illustrative only, and I may make changes in detail, especially in matter of shape, size and arrangement of parts, within the principle of the invention, to the full extent indicated by the broad general meaning of the terms in which the appended claims are expressed.

I claim as my invention:

1. In a device of the class described, in combination: a cathode ray tube including a target assembly and an electron gun directing a beam of electrons of substantial cross sectional area to normally impinge upon a predetermined portion of said target assembly, said target assembly comprising filar grids of material having a relatively high temperature coefficient of resistance and means mounting said grids symmetrically with respect to said predetermined portion for normal equal impingement by said beam, said beam being deflectable in response to a condition to impinge said grids unequally, thereby varying their relative resistance by varying their temperature.

2. In a device of the class described, in combination: a cathode ray tube including a target assembly and an electron gun directing a beam of electrons of substantial cross sectional area to normally impinge upon a predetermined portion of said target assembly, said assembly comprising filar grids of material having a relatively high temperature coefficient of resistance and means mounting said grids symmetrically with respect to said predetermined portion for normal equal impingement by said beam, said beam being deflectable in response to a condition to impinge said grids unequally, thereby varying their relative resistance by varying their temperature; and rebalancing means causing relative movement between said target and the axis of said beam on deflection thereof, to restore said normal impingement.

3. In a device of the class described, in combination: a cathode ray tube including a target assembly and an electron gun directing a beam of electrons of substantial cross sectional area to normally impinge upon a predetermined portion of said target assembly, said assembly comprising filar grids of material having a relatively high temperature coefficient of resistance and means mounting said grids symmetrically with respect to said predetermined portion for normal equal impingement by said beam, said beam being deflectable in response to a condition to impinge said grids unequally, thereby varying their relative resistance by varying their temperature; and rebalancing means causing relative movement between said target assembly and the axis of said beam on deflection thereof, to restore said normal impingement, said rebalancing means comprising a normally energized resistance bridge including means connecting said grids to comprise arms thereof, a motor, and means energizing said motor in accordance with the output of said bridge.

4. In a device of the class described, in combination: a cathode ray tube including a target assembly and an electron gun directing a beam of electrons of substantial cross sectional area to normally impinge upon a predetermined portion of said target assembly, said target assembly comprising filar grids of material having a relatively high temperature coefficient of resistance and means mounting said grids symmetrically with respect to said predetermined portion for normal equal impingement by said beam, said beam being deflectable in response to a condition to impinge said grids unequally, thereby varying their relative resistances by varying their temperature; rebalancing means causing relative movement between said target assembly and the axis of said beam, said rebalancing means comprising a normally energized resistance bridge including means connecting said grids to comprise arms thereof, a motor, and means energizing said motor in accordance with the output of said bridge; an indicator, and means connecting said indicator with said motor for actuation thereby.

5. In a device of the class described, in combination: a cathode ray tube including a target assembly and an electron gun directing a beam of electrons of substantial cross sectional area to normally impinge upon a predetermined portion of said target assembly, said asssembly comprising filar grids of material having a relatively high temperature coefficient of resistance and means mounting said grids symmetrically with respect to said predetermined portion for normal equal impingement by said beam, said beam being deflectable in response to a condition to impinge said grids unequally, thereby varying their relative resistance by varying their temperature; rebalancing means causing relative movement between said target assembly and the axis of said beam on deflection thereof, to restore said normal impingement, said rebalancing means comprising a normally energized resistance bridge including means connecting said grids to comprise arms thereof, a motor, means energizing said motor in accordance with the output of said bridge; and means effective independent of said condition to deflect said beam with respect to said target assembly in response to operation of said motor.

6. In a device of the class described, in combination: a cathode ray tube including a target assembly and an electron gun directing a beam of electrons of substantial cross sectional area to normally impinge upon a predetermined portion of said target assembly, said assembly comprising filar grids of material having a relatively high temperature coefficient of resistance and means mounting said grids symmetrically with respect to said predetermined portion for normal equal impingement by said beam, said beam being deflectable in response to a condition to impinge said grids unequally, thereby varying their relative resistances by varying their temperature, a normally energized electric bridge including means connecting said grids to comprise arms thereof; a motor; means energizing said motor in accordance with the output of said bridge, indicating means actuated by said motor, and further means actuated by said motor for rebalancing said bridge.

7. In a device of the class described, in combination: a cathode ray tube including a target assembly and an electron gun directing a beam of electrons of substantial cross sectional area to normally impinge upon a predetermined portion of said target assembly, said assembly comprising filar grids of material having a relatively high temperature coefficient of resistance and means mounting said grids symmetrically with respect to said perdetermined portion for normally equal impingement by said beam, said beam being deflectable in response to a condition to impinge said grids unequally, thereby varying their relative resistances by varying their temperature; rebalancing means causing relative movement between said target assembly and the axis of said beam, said rebalancing means comprising a normally energized resistance bridge including means connecting said grids to comprise arms thereof, a motor, means energizing said motor in accordance with the output of said bridge, and means connecting said motor with said cathode ray tube for moving said tube as a unit, thereby displacing said target assembly with respect to said axis of said beam.

8. In a device of the class described, in combination: a mounting member; a plurality of filar grids of material having a relatively high temperature co-efficient of resistance carried by said member; means mounting said grids in bilaterally symmetrical pairs about a common axis; means connecting the grids of each pair in a separate series circuit, said separate circuits having a single common point; means making electrical connection to each said circuit; means differentially heating said grids in response to a condition; means cooperating with each of said pairs of grids to comprise a normally energized resistance bridge, the balance of said bridge being affected by variation in the resistances of said grids consequent upon the differential heating thereof; and means responsive to unbalance of said bridge.

9. In a device of the class described, in combination: a mounting member; a plurality of filar grids of material having a relatively high temperature co-efficient of resistance carried by said member; means mounting said grids in bilaterally symmetrical pairs about a common axis; means connecting the grids of each pair in a series circuit; means making electrical connection to each said circuit; means differentially heating said grids in response to a condition; means cooperating with each of said pairs of grids to comprise a normally energized resistance bridge, the balance of said bridge being affected by variation in the resistance of said grids consequent upon differential heating thereof; and means responsive to unbalance of said bridge for equalizing the heating of said grids.

10. In a device of the class described, in combination: a mounting member; a plurality of filar grids of material having a relatively high temperature co-efficient of resistance carried by said member; means mounting said grids in bilaterally symmetrical pairs about a common axis; means connecting the grids of each pair in a separate series circuit, said separate circuits having a single common point; means making electrical connection to each said circuit; means differentially heating said grids in response to a condition; indicating means; and means associating said indicating means with said grids for actuation in accordance with the difference between the temperatures thereof.

11. Means deriving from the deflection of a beam of a cathode ray tube in response to a condition, an electrical signal in a low impedance network, comprising said cathode ray tube; target means enclosed in the envelope of said tube, said target means including a pair of target members of material having a relatively high temperature coefficient of resistance, and means mounting said target means for normally equal impingement of said members by said beam, said impingement being effective to raise the temperature of the target members, whereby to vary the resistance thereof; means completing a low impedance electric circuit through said target means; and means interpreting changes in the resistance of said member, due to change in the differential heating thereof caused by deflection of said beam, in terms of change in the condition causing said deflection.

12. Means deriving from the deflection of the beam of a cathode ray tube in response to a condition an electrical signal in a low impedance network comprising said cathode ray tube; a pair of target members of material having a relatively high temperature coefficient of resistance enclosed in the envelope and means mounting said target members for normally equal impingent of said members by said beam, said impingement being effective to raise the temperature of said target members whereby to vary the resistance thereof; means completing a low impedance electric circuit through said target members; means interpreting changes in the resistance of said members, due to change in the differential heating thereof caused by deflection of said beam, in terms of change in the condition causing said deflection; and means actuated by said last named means for causing said beam and said target members to resume said normal relationship.

13. Means deriving from the deflection of the beam of a cathode ray tube in response to a condition an electrical signal in a low impedance network comprising said cathode ray tube; target means enclosed in the envelope of said tube, said target means including a plurality of filar target members of material having a relatively high temperature coefficient of resistance and means mounting said target members in pairs for normally equal impingement thereof by said beam, said impingement being effective to raise the temperature of said target members whereby to vary the resistances thereof; means connecting the members of each pair in a single series circuit; means associated with each of said pairs to comprise a normally energized resistance bridge, said bridges having a common terminal; and means interpreting changes in the resistance of said members, due to change in the differential heating thereof caused by deflection of said beam, in terms of change in the condition causing said deflection.

14. Means deriving from the deflection of the beam of a cathode ray tube in response to a condition an electrical signal in a low impediance network comprising said cathode ray tube; target means enclosed in the envelope of said tube, said target means including at least one target member of material having a relatively high temperature coefficient of resistance and means mounting said target members for normally equal impingement of said member by said beam, said impingement being effective to raise the temperature of said target member whereby to vary the resistance thereof; means completing a low impedance electric circuit through said target member; and means interpreting changes in the resistance of said member, due to change in the differential heating thereof caused by deflection of said beam, in terms of change in the condition causing said deflection.

CURTISS R. SCHAFER.

REFERENCES CITED

The following references are of record in the file of this patent:

UNITED STATES PATENTS

| Number | Name | Date |
| --- | --- | --- |
| 2,002,353 | Reinken | May 21, 1935 |
| 2,027,393 | McCreary | Jan. 14, 1936 |
| 2,273,596 | Rylsky | Feb. 17, 1942 |
| 2,363,791 | Holden | Nov. 28, 1944 |
| 2,396,244 | Borsum | Mar. 12, 1946 |